United States Patent Office 2,880,125
Patented Mar. 31, 1959

2,880,125

FLUX COMPOSITIONS AND PROCESSES FOR SOLDERING AND METAL COATING

Elfred A. Jordan, River Forest, and Frederick B. Lederer, Sr., Chicago, Ill.; said Lederer assignor to said Jordan No Drawing. Application July 30, 1956
Serial No. 600,680

8 Claims. (Cl. 148—23)

The instant invention relates to improved fluxes for the joining and for the coating of metals and to methods for their use. More particularly, it relates to fluxes having more desirable characteristics and which are easier and more economical to use than those heretofore available.

In soldering and in metal coating processes, it is the general practice to employ a fluxing agent to remove films from and to clean the surfaces of the metals to be joined or coated. To produce a good result in soldering or metal coating, a true alloy must be formed between the metals. The presence of impurities and/or oxide coating on the surface of the metal interferes with the alloying of the metals and results in a contaminated joint of poor adhesion. Fluxes are used to clean the surface of interfering impurities and oxides and to promote formation of a smooth and strong joint or metal coating.

At present, zinc chloride either in solid form or in a carrier such as an aqueous solution is in wide use as a flux for soldering and metal coating, but its use has several serious disadvantages. It deposits fused residues which cause corrosion unless removed. Also the fumes from zinc chloride fluxes have a very corrosive action and are dangerous.

Fluxes containing hydrohalogen salts of organic bases, such as those of hydrazine and its derivatives, alone or in combination with one or more salts of ammonia, an amine, a tetra alkylammonium halide, or an aliphatic carboxylic acid amide and the like have also been used. Although most of these type fluxes are less corrosive than zinc chloride, their fluxing activity is generally not as great as zinc chloride.

A satisfactory flux for joining and for coating metals should have the following characteristics: It is capable of cleaning the metal, removing oxides, and preventing oxidation of the metals; it should be fluid at soldering or metal coating temperatures and spread easily; it should be capable of being displaced from the metal by the solder or coating metal and should reduce the surface tension of the molten solder or coating metal and the metal to be soldered or coated; it should leave no corrosive residues; and its use should involve a minimum of unpleasantness and of health hazards.

It is an object of the instant invention to provide fluxes for the joining and for the coating of metals which have characteristics superior to those of the prior art.

It is a further object of the instant invention to provide improved fluxes for soldering, tinning, galvanizing, and lead coating which are highly active, highly versatile, and substantially non-corrosive, and processes for their use.

It is a further object of the instant invention to provide commercially feasible processes for producing superior quality soldering, tinning, galvanizing, and metal coating in general.

These and other objects of the instant invention will become more apparent from the following description.

We have found that the foregoing objects are obtained by use of a fluxing composition comprising essentially at least one ammonia derivative as herein described and a major amount of at least one hydrohalide salt of at least one amino compound from the class consisting of: hydroxy amines represented by the formula

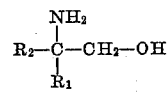

wherein $R_1$ is from the group consisting of hydrogen, methyl, ethyl, and hydroxymethyl, $R_2$ is from the group consisting of hydrogen, hydroxymethyl, methyl and ethyl; $N^1(2$ - hydroxyalkyl$)2$ - methyl - 1,2 - propanediamine, wherein the alkyl is from the group consisting of ethyl and propyl; mono-, di-, and triethanolamines; hydroxylamine; and furfurylamine. Additional specific hydroxy amines which may be employed include the following: 2-amino-1-butanol; 2-amino-2-methyl-1-propanol; 2-amino - 2 - methyl - 1,3 - propanediol; 2 - amino - 2 - ethyl-1,3-propanediol; tris(hydroxymethyl)aminomethane; isopropyldiethanolamine; and isopropylaminoethanol.

The ammonia derivatives employed in the instant fluxes are from the group consisting of urea, ammonium chloride, and ammonium bromide.

The hydrohalide salt of the above amines contains a halogen from the group consisting of chlorine and bromine. In one practice of the instant invention, the amine hydrochloride or hydrobromide is mixed with at least one of the ammonia derivatives. Alternately, an amine, the ammonia derivative, and hydrochloric acid or hydrobromic acid are combined.

Generally the instant compositions contain between about 50% and about 99% by weight, preferably between about 80% and about 99% by weight, of amine hydrohalide or combination of hydrohalides. In preparing the instant compositions, any one of the above amines or combination of two or more of these amines can be used. If desired, guanidine can be substituted for up to about 10% of the amine.

In preparing the instant flux compositions the hydrochloride and/or hydrobromide salt of the amine can be used, or the amine and hydrochloric or hydrobromic acid can be mixed with the other components. In the case of the polyamines, the amine polyhydrochloride and polyhydrobromide salts can be used as well as the amine monohydrochloride and monohydrobromide. When the instant composition contains more than one amine, any combination of the above hydrohalide salts of the various amines can be used. The amines or the amine salts can be added in substantially pure form, or as a solution or emulsion. For example, the amine or amine hydrohalide salt can be added with water; dissolved in an alcohol, such as isopropyl alcohol, methyl alcohol, ethyl alcohol, or other solvent, with or without a portion of water. For example, some amine hydrohalides such as triamyl-amine hydrochloride and hydrobromide are of limited solubility in water. In preparing the instant fluxes the hydrohalide can be dissolved in alcohol, such as isopropyl alcohol, or a solution containing about equal parts of alcohol and water. If desired, a conventional emulsifier can be used to aid in dissolving of the amine hydrohalide.

The ammonia derivative of the instant composition is generally present in amount between about 0.5% and about 49%, preferably between about 0.5% and about 30% by weight. Ammonium chloride, ammonium bromide, or urea can be employed singly, in a pair or all three of these ammonia derivatives may be employed, either in equal or unequal proportions by weight. In the preferred embodiment urea is used.

In the preferred embodiment of the instant invention the compositions also contain between about 0.2% and about 2.0% by weight of a wetting agent or combination of several wetting agents. The effect of wetting agents is well known, and amounts of wetting agents outside of this range may be employed if desired. Any one or combination of the many commercially available conventional non-ionic wetting agents which are not affected by the hydrogen ion concentration and conventional cationic wetting agents may be employed. Mixtures of anionic and nonionic wetting agents can also be used for neutral or for alkaline fluxes.

Specific wetting agents which can be employed are obvious to those skilled in the art. Typical of the many well known cationic wetting agents which can be employed are the alkyl trimethyl ammonium chlorides, wherein the alkyl group is derived from fatty acids, such as soya fatty acid and coconut fatty acid. Typical examples of this class of conventional wetting agents are sold under the trade names "Arquad S" and "Arquad C" by Armour and Company. Another type of the many commercially available wetting agents are the polyethylene glycol alkylphenyl ethers. "Nonic 300" by Sharples Chemicals, Incorporated, is a typical example of this class of wetting agents.

When the instant compositions comprising essentially the hydrohalide of the amine, the ammonia derivative, and the wetting agent are used as a flux, it is generally mixed with a carrier such as water; a solvent such as isopropyl alcohol, ethyl alcohol, methyl alcohol, and mixtures of alcohol and water; acetone; or a plastifier, such as petrolatum, rosin, and other substances conventionally employed for this purpose. The various fluxes can be used ranging from paste form to a diluted form of up to about one hundred and forty parts carrier per part of flux. Generally water is the preferred carrier.

These aqueous compositions may be substantially neutral, slightly alkaline or may contain an amount of free acid up to about 7% by weight, for example as determined by titration with methyl orange or other suitable indicator. The acidity, as well as the degree of dilution of the flux, depends upon the particular type job for which the flux is to be used. The factors involved in the determination of the degree of dilution used, and whether a neutral flux or a flux having a small percentage of free acid, are well known to those skilled in this art. Generally, for most work an aqueous fluxing composition which is substantially neutral or which has a small percentage of free acid is desired.

The instant flux compositions are highly versatile, and each or a combination of the various fluxes can be used for a wide variety of jobs in the fields of joining and coating of metals. These fluxes can be used for any of the conventional soldering processes such as soft soldering, in the same manner as are the presently known fluxes. That is, in use, the flux, the solder, and the metal or alloy to be treated is heated for example to between 120° F. and 900° F. to activate the flux, fuse the solder, and make the joint. After cooling, the soldered joint is smooth and strong, and will not corrode.

The instant fluxes can also be used in all forms of soldering such as dip soldering, hand soldering, sweat soldering, torch soldering, convection soldering, baked soldering, mechanical soldering, and so on.

The instant fluxes can also be used in conventional galvanizing, tinning, and lead coating processes for coating a metal object with metal to obtain a desired type finish, which involves dipping the object into the flux dip and then into the molten metal. If desired, the instant fluxes can also be mixed with water and used in the conventional manner as a pre-flux dip. The instant fluxes can also be used in the conventional manner with a binder or absorption material to be filled into a hollow core of solder.

The instant flux compositions are useful in connection with the metals commonly used in soldering, tinning, galvanizing, and similar processes, such as copper, brass, bronze, zinc, tin, galvanized surfaces, iron, steel, and alloys of these. The fluxes are used where a wide variety of metal finishes are desired. For example, the following types of finishes can be obtained: in soldering processes, a bright finish of solder is obtained; in galvanizing processes, by selection of the flux, either spangel or satin finishes are obtained; in tinning and in lead coating processes, bright finishes are obtained.

In order to more fully illustrate the character of the instant invention, but without intention to be limited thereto, the following specific examples are given.

*Example I*

A flux was prepared by mixing 500 grams 2-amino-2-methyl-1-propanol, 986 grams of 20° Bé. hydrochloric acid, about 100 grams urea, and about 5 grams of a cationic wetting agent, such as "Arquad C." This flux may be prepared with hydrobromic acid instead of hydrochloric acid.

This flux can be used in concentrated form, or it can be diluted with a carrier, such as water. If an acidic flux is desired, hydrobromic acid or hydrochloric acid is added in amount to produce a free acidity of up to about 7.0% by weight. The above flux can be used in processes for the joining or coating of metals, such as steel, galvanized iron, terneplate (tin-lead alloy), copper, brass, tinplate, and many others.

Depending upon preference and factors well known to those skilled in the art, the flux can be used in various degrees of dilution. In most cases, about 1 part of flux is diluted with between about one and about 120 parts carrier, such as water.

*Example II*

A flux was prepared by mixing 1370 grams tris (hydroxymethyl) aminomethane, 1589 grams 20° Bé. hydrochloric acid, 10 grams of a mixture containing about equal parts of urea, ammonium chloride, and ammonium bromide, 1096 grams water, and 15 grams of at least one cationic wetting agent, such as "Arquad C" and/or "Arquad S."

The flux may alternately be prepared using hydrobromic acid instead of the hydrochloric acid. If desired, the amine hydrochloride or hydrobromide in substantially dry form can be mixed with the urea, and water may be added later or at the time of use.

*Example III*

A flux was prepared by mixing about 1462 grams hydroxyl-ammonium chloride, 2285 cubic centimeters water, 30 cubic centimeters of cationic wetting agent, and 200 grams ammonium chloride.

If desired, hydrochloric acid or hydrobromic acid can be added to obtain a flux containing up to about 7% by weight free acid.

A single wetting agent or a combination of several wetting agents can also be employed. For example, both Arquad C and Arquad S can be mixed with the flux; or a non-ionic wetting agent such as "Nonic 300" can be added together with a cationic agent such as "Arquad C" or "Arquad S."

*Example IV*

A flux was prepared by mixing 330 grams furfurylamine, 480 grams hydrobromic acid, 15 grams non-ionic wetting agent, and 50 grams of urea.

The resulting flux was suitable in a wide variety of soldering and metal coating processes, and can be used in concentrated form or diluted with water, alcohol, or other conventional carrier. Hydrochloric acid can be used to replace the hydrobromic acid.

*Example V*

Fluxes were prepared, in the same manner described in the above examples, using mono-, di-, and triethanolamines with urea and a non-ionic wetting agent. These compositions are used when substantially neutral, slightly alkaline, or containing up to about 7.0% by weight free acid, depending upon the particular use of the flux. When an acidic flux is desired, an additional amount of hydrochloric acid or hydrobromic acid is mixed therein. If desired, a small additional quantity of non-ionic wetting agent such as "Nonic 300" can be added at the time of use, for example when the metals worked with are exceptionally greasy.

The fluxes prepared in accordance with the instant invention are useful in processes involving the joining and coating of a wide variety of metals, such as stainless steel, galvanized iron, black iron, terneplate (tin-lead alloy), copper, brass, bronze, tinplate, and many other metals and alloys.

Depending upon individual preference and the type of process involved, the instant fluxes can be used in various degrees of dilution. The factors for determining the desired degree of dilution are well known to those skilled in the art. However, when used, the concentration of flux generally ranges between about 1 and about 120 parts carrier per part of flux. Generally, water is employed as the carrier. The fluxes can be mixed with the carrier when prepared or diluted with water just prior to the time of use.

Other conventional flux carriers can also be used as carriers with the above fluxes. For example, alcohols, such as isopropyl alcohol, petrolatum and the like can be used as carrier, preferably with an emulsifier, such as ethanolamine oleate to aid in mixing. Any of the known emulsifiers can be used, for example ammonium oleate, or any other ammonium or amine soap of a long chain fatty acid.

The foregoing shows that a wide variety of improved fluxing fluids can be prepared in accordance with the instant invention. These fluxes are highly versatile and in metal coating processes can be applied to metals and alloys by dipping, spraying, wiping or any of the conventional methods for utilizing fluxes in soldering, tinning, lead coating and galvanizing processes. Use of the instant fluxes is commercially feasible. They are easy to work with, have exceptionally good spreading action, and are substantially harmless after the soldering or the metal coating process.

Having thus fully described and illustrated the character of the instant invention, what we desire protected by Letters Patent is:

1. A composition, which upon dilution is suitable for use as a flux for the joining and for the coating of metals and which at fluxing temperatures consists essentially of as a first component at least one ammonia derivative selected from the group consisting of urea, ammonium chloride, and ammonium bromide, and as a second component between about 80 percent by weight and about 99 percent by weight of at least one amine hydrohalide, the halogen being selected from the group consisting of chlorine and bromine, and the amine containing compound being selected from the class consisting of: hydroxyamines represented by the general formula

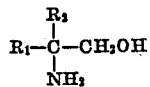

wherein $R_1$ is selected from the group consisting of hydrogen, methyl, ethyl, and hydroxymethyl, $R_2$ is selected from the group consisting of hydroxymethyl, methyl, and ethyl; $N^1$(2-hydroxyalkyl)-2-methyl-1,2-propanediamine, wherein the alkyl is selected from the group consisting of ethyl and propyl; mono-, di-, and triethanolamines; hydroxylamine; furfurylamine; isopropyldiethanolamine; and isopropylaminoethanol.

2. In processes for joining and coating of metals involving dipping of said metal in an aqueous pre-flux dip, the improvement comprising use of a preflux dip containing a flux consisting essentially of as a first component at least one ammonia derivative selected from the group consisting of urea, ammonium chloride, and ammonium bromide, and as a second component between about 80 percent by weight and about 99 percent by weight of at least one amine hydrohalide, the halogen being selected from the group consisting of chlorine and bromine, and the amine containing compound being selected from the class consisting of: hydroxyamines represented by the general formula

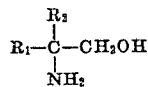

wherein $R_1$ is selected from the group consisting of hydrogen, methyl, ethyl, and hydroxymethyl, $R_2$ is selected from the group consisting of hydroxylmethyl, methyl, and ethyl; $N^1$(2-hydroxyalkyl)-2-methyl-1,2-propanediamine, wherein the alkyl is selected from the group consisting of ethyl and propyl; hydroxylamine; furfurylamine, isopropyldiethanolamine; and isopropylaminoethanol.

3. A composition which upon dilution is suitable for use as a flux for joining and for coating metals and which at temperatures of between 120° F. and 900° F. is substantially non-corrosive and which leaves no harmful residues after fluxing, which consists essentially of: as a first component at least about 86 percent by weight of at least one amine hydrohalide, the halogen being selected from the group consisting of chlorine and bromine, and the amine-containing compound being selected from the class consisting of: hydroxyamines represented by the general formula

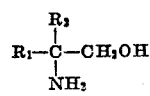

wherein $R_1$ is selected from the group consisting of hydrogen, methyl, ethyl, and hydroxymethyl, and $R_2$ is selected from the group consisting of methyl, ethyl, and hydroxymethyl; $N^1$(2 - hydroxyalkyl) - 2 - methyl - 1,2- propanediamine, wherein the alkyl is selected from the group consisting of ethyl and propyl; hydroxylamine; and furfurylamine; isopropyldiethanolamine; and isopropylaminoethanol; and as a second component at least about 0.5% by weight of an ammonia derivative selected from the group consisting of urea, ammonium chloride, and ammonium bromide; and as a third component between about 0.2% and about 2% by weight of at least one wetting agent from the group consisting of nonionic and cationic wetting agents.

4. The composition of claim 3 wherein the amine compound is 2-amino-1-butanol.

5. The composition of claim 3 wherein the amine compound is 2-amino-2-methyl-1-propanol.

6. The composition of claim 3 wherein the amine compound is 2-amino-2-methyl-1,3-propanediol.

7. The composition of claim 3 wherein the amine compound is tris (hydroxymethyl) aminomethane.

8. The composition of claim 3 wherein the amine compound is 2-amino-2-ethyl-1,3-propanediol.

References Cited in the file of this patent

UNITED STATES PATENTS

| | | |
|---|---|---|
| 1,785,134 | McQuaid | Dec. 16, 1930 |
| 1,882,734 | Barber | Oct. 18, 1932 |
| 2,659,684 | Neish | Nov. 17, 1953 |
| 2,772,192 | Wobbe | Nov. 27, 1956 |

FOREIGN PATENTS

| | | |
|---|---|---|
| 675,407 | Great Britain | July 9, 1952 |
| 675,954 | Great Britain | July 16, 1952 |